(12) United States Patent
Aybay et al.

(10) Patent No.: US 8,284,664 B1
(45) Date of Patent: Oct. 9, 2012

(54) REDIRECTING DATA UNITS TO SERVICE MODULES BASED ON SERVICE TAGS AND A REDIRECTION TABLE

(75) Inventors: Gunes Aybay, Los Altos, CA (US); Harshad Nakil, San Jose, CA (US); Fuguang Shi, Saratoga, CA (US); Jack Kohn, Mountain View, CA (US); David Rowell, Mountain View, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 829 days.

(21) Appl. No.: 11/863,480

(22) Filed: Sep. 28, 2007

(51) Int. Cl.
*H04J 1/16* (2006.01)
(52) U.S. Cl. ......... 370/235; 370/236; 370/389; 370/412
(58) Field of Classification Search .................. 370/235, 370/236, 389, 412
See application file for complete search history.

(56) References Cited

U.S. PATENT DOCUMENTS

| | | | |
|---|---|---|---|
| 5,487,061 A * | 1/1996 | Bray ............................ | 370/252 |
| 5,613,136 A | 3/1997 | Casavant et al. | |
| 5,721,855 A | 2/1998 | Hinton et al. | |
| 5,859,846 A * | 1/1999 | Kim et al. .................. | 370/395.62 |
| 5,933,601 A | 8/1999 | Fanshier et al. | |
| 6,018,518 A * | 1/2000 | Smallwood et al. .......... | 370/235 |
| 6,052,720 A | 4/2000 | Traversat et al. | |
| 6,101,500 A | 8/2000 | Lau | |
| 6,148,337 A | 11/2000 | Estberg et al. | |
| 6,163,544 A | 12/2000 | Andersson et al. | |
| 6,212,559 B1 | 4/2001 | Bixler et al. | |
| 6,223,260 B1 | 4/2001 | Gujral et al. | |
| 6,263,346 B1 | 7/2001 | Rodriquez | |
| 6,272,537 B1 | 8/2001 | Kekic et al. | |
| 6,310,890 B1 | 10/2001 | Choi | |
| 6,374,329 B1 | 4/2002 | McKinney et al. | |
| 6,389,464 B1 | 5/2002 | Krishnamurthy et al. | |
| 6,393,481 B1 | 5/2002 | Deo et al. | |
| 6,405,289 B1 | 6/2002 | Arimilli et al. | |
| 6,466,973 B2 | 10/2002 | Jaffe | |
| 6,477,566 B1 | 11/2002 | Davis et al. | |
| 6,477,572 B1 | 11/2002 | Elderton et al. | |
| 6,480,955 B1 | 11/2002 | DeKoning et al. | |
| 6,502,131 B1 | 12/2002 | Vaid et al. | |
| 6,510,164 B1 | 1/2003 | Ramaswamy et al. | |
| 6,516,345 B1 | 2/2003 | Kracht | |
| 6,529,941 B2 | 3/2003 | Haley et al. | |
| 6,563,800 B1 | 5/2003 | Salo et al. | |
| 6,636,242 B2 | 10/2003 | Bowman-Amuah | |
| 6,662,221 B1 | 12/2003 | Gonda et al. | |
| 6,671,257 B1 * | 12/2003 | Soumiya et al. ........... | 370/230.1 |
| 6,681,232 B1 | 1/2004 | Sistanizadeh et al. | |

(Continued)

OTHER PUBLICATIONS

Harmon, William "32-Bit Bus Master Ethernet Interface for the 68030 (Using the Macintosh SE/30)," Apr. 1993.

(Continued)

*Primary Examiner* — John Blanton
*Assistant Examiner* — Jay P Patel
(74) *Attorney, Agent, or Firm* — Shumaker & Sieffert, P.A.

(57) ABSTRACT

A device may receive a data unit and identify a class of the received data unit. The device may further obtain a service tag based on the class of the data unit and send the service tag and the data unit to a service module in the network device. The service module may perform a service for the data unit.

18 Claims, 7 Drawing Sheets

U.S. PATENT DOCUMENTS

| | | | |
|---|---|---|---|
| 6,738,908 B1 | 5/2004 | Bonn et al. | |
| 6,804,816 B1 | 10/2004 | Liu et al. | |
| 6,816,905 B1 | 11/2004 | Sheets et al. | |
| 6,934,745 B2 | 8/2005 | Krautkremer | |
| 6,952,728 B1 | 10/2005 | Alles et al. | |
| 6,983,317 B1 | 1/2006 | Bishop et al. | |
| 6,990,517 B1 | 1/2006 | Bevan et al. | |
| 7,023,820 B2 * | 4/2006 | Chaskar | 370/329 |
| 7,069,344 B2 | 6/2006 | Carolan et al. | |
| 7,072,300 B1 * | 7/2006 | Chow et al. | 370/236 |
| 7,082,463 B1 | 7/2006 | Bradley et al. | |
| 7,082,464 B2 | 7/2006 | Hasan et al. | |
| 7,305,492 B2 | 12/2007 | Bryers et al. | |
| 7,765,328 B2 | 7/2010 | Bryers et al. | |
| 7,940,756 B1 * | 5/2011 | Duffy et al. | 370/389 |
| 2001/0042190 A1 | 11/2001 | Tremblay et al. | |
| 2002/0007443 A1 | 1/2002 | Gharachorloo et al. | |
| 2002/0032725 A1 | 3/2002 | Araujo et al. | |
| 2002/0038339 A1 | 3/2002 | Xu | |
| 2002/0105972 A1 | 8/2002 | Richter et al. | |
| 2003/0097428 A1 | 5/2003 | Afkhami et al. | |
| 2004/0213232 A1 * | 10/2004 | Regan | 370/390 |
| 2005/0021713 A1 | 1/2005 | Dugan et al. | |
| 2006/0146825 A1 * | 7/2006 | Hofstaedter et al. | 370/392 |
| 2008/0002720 A1 * | 1/2008 | Chao et al. | 370/395.53 |
| 2008/0240113 A1 * | 10/2008 | Arad et al. | 370/395.53 |

OTHER PUBLICATIONS

Troutman, Denise "DP83916EB-AT: High Performance AT Compatible Bus Master Ethernet Adapter Card," Nov. 1992.

Papavassiliou, "Network and service management for wide-area electronic commerce networks," International Journal of Network Management, John Wiley & Sons, Ltd., Mar. 2001, vol. 11, Issue 2, pp. 75-90.

Muller, "Managing Service Level Agreements," International Journal of Network Management, John Wiley & Sons, Ltd., May 1999, vol. 9, Issue 3, pp. 155-166.

Schmidt, "A Family of Design Patterns for Flexibly Configuring Network Services in Distributed Systems," Proceedings of the Third International Conference on Configurable Distributed Systems, May 6-8, 1996, IEEE Press, pp. 124-135.

* cited by examiner

US 8,284,664 B1

REDIRECTING DATA UNITS TO SERVICE MODULES BASED ON SERVICE TAGS AND A REDIRECTION TABLE

BACKGROUND

A network element, such as a router or a switch, may include service modules that process packets. When the network element receives a packet at an ingress interface, the network element may send the packet to one of its service modules to render specialized services for the packet (e.g., hypertext transfer protocol (HTTP) caching service, intrusion detection system (IDS) service, load balancing service, firewall service, etc.). Upon rendering the services, the network element may drop the packet or send the original or modified packet to another network element through one of the egress interfaces.

SUMMARY

According to one aspect, a method may include receiving a data unit at an ingress line interface of a network device, identifying a class of the received data unit, obtaining a service tag based on the class of the data unit, sending the service tag and the data unit across a switch fabric to a service module in the network device, and performing a service for the data unit at the service module.

According to another aspect, a device may include a first line interface and a service module. The first line interface may be configured to receive a data unit, identify a class of the received data unit, obtain a data unit descriptor and a service tag using the data unit, augment the data unit by combining the data unit with the data unit descriptor and the service tag, and send the augmented data unit to a service module. The service module may be configured to receive the augmented data unit from the first line interface and render a service for the augmented data unit. In addition, the service module may be configured to perform one of: send the augmented data unit to another service module, send the augmented data unit to a second line interface, or drop the augmented data unit.

According to yet another aspect, a device may include means for receiving a data unit at a network device, means for obtaining a data unit descriptor based on a forwarding table and the received data unit, means for identifying a class of the received data unit, means for obtaining a service tag based on the class of the received data unit, means for augmenting the data unit by attaching the service tag and the data unit descriptor to the data unit, means for retrieving an address of a destination service module from a redirection table by using a redirection index in the service tag, and means for sending the data unit to the service module based the address of the destination service module.

DETAILED DESCRIPTION OF PREFERRED EMBODIMENTS

The following detailed description refers to the accompanying drawings. The same reference numbers in different drawings may identify the same or similar elements.

The term "redirection" or "redirecting" a data unit, as used herein, may refer to sending a data unit from a hardware and/or software component of a network element to another component of the network element. The term "data unit," as used herein, may refer to a packet, datagram, cell, a fragment of a packet, or other types of data that may be carried at a specified communication layer. As used herein, the term "service module" may refer to, within a network element, a logical or physical unit for performing a set of tasks or a service for a data unit that arrives at the network element. For example, a service module may provide a load balancing service, a firewall service, an intrusion detection system (IDS) service, a hypertext transfer protocol (HTTP) service, an encryption/decryption service, etc. A service module may be implemented in hardware, software, or a combination of hardware and software.

In the following, when a data unit is received at a line interface in a network element, the line interface may obtain a service tag for the data unit based on a lookup in an access control list (ACL). The service tag may include an index into a table, herein referred to as a redirection table, that designates one or more service modules and information about specific processing that the data unit may require.

Based on the service tag, the data unit may be sent from the line interface to the designated service modules. Each of the service modules may render a specific service and redirect the data unit to its next destination service module, based on the redirection table and/or the processing information provided in the service tag. After a last service at one of the service modules, the data unit may be either dropped or sent to an egress line interface for transmission from the network element into the network.

By using the service tag and the redirection table, at each service module, the data unit may be directed to a next service module or a line interface without an ACL lookup. Because the ACL lookup requires additional processing, without the ACL lookup, the data unit may be processed faster.

In addition, using the service tag and the redirection table may spare a user or an administrator from having to treat each service module as a network node with a network address. Treating a service module as a network node may require an administrator or a user to perform burdensome and mistake-prone tasks that are associated with reconfiguring network parameters (e.g., virtual local area network (VLAN) parameters) when a service module is added to or removed from the network element.

Figure 1:
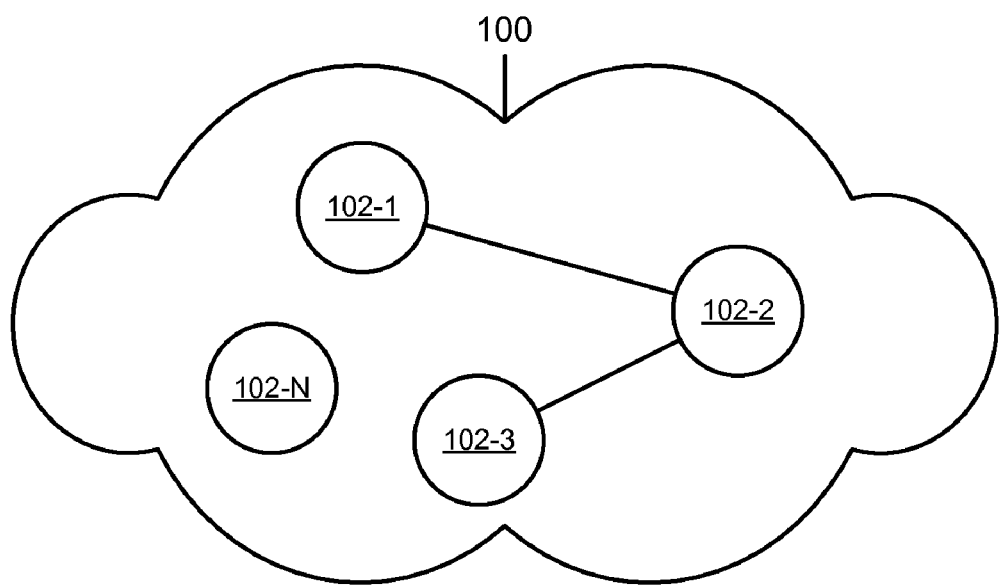
FIG. 1 is a diagram of an exemplary network in which the concepts described herein may be implemented.

FIG. 1 is a diagram of an exemplary network 100 in which the concepts described herein may be implemented. Network 100 may include the Internet, an ad hoc network, a local area network (LAN), a wide area network (WAN), a metropolitan area network (MAN), a cellular network, a public switched telephone network (PSTN), any other network, or combinations of networks.

As shown, network 100 may include N network elements 102-1 through 102-N (collectively referred to herein as "network element 102"). Each of network elements 102-1 through 102-N may include switches, routers, servers, and/or other types of devices. While network elements 102-1 through 102-N can be implemented as different types of devices, in the following paragraphs, network elements 102-1 through 102-N will be described in terms of a router. The links interconnecting network elements 102-1 through 102-N are shown by way of example. Network elements 102-1 through 102-N may be interconnected via various different links than those shown in FIG. 1.

Figure 2:
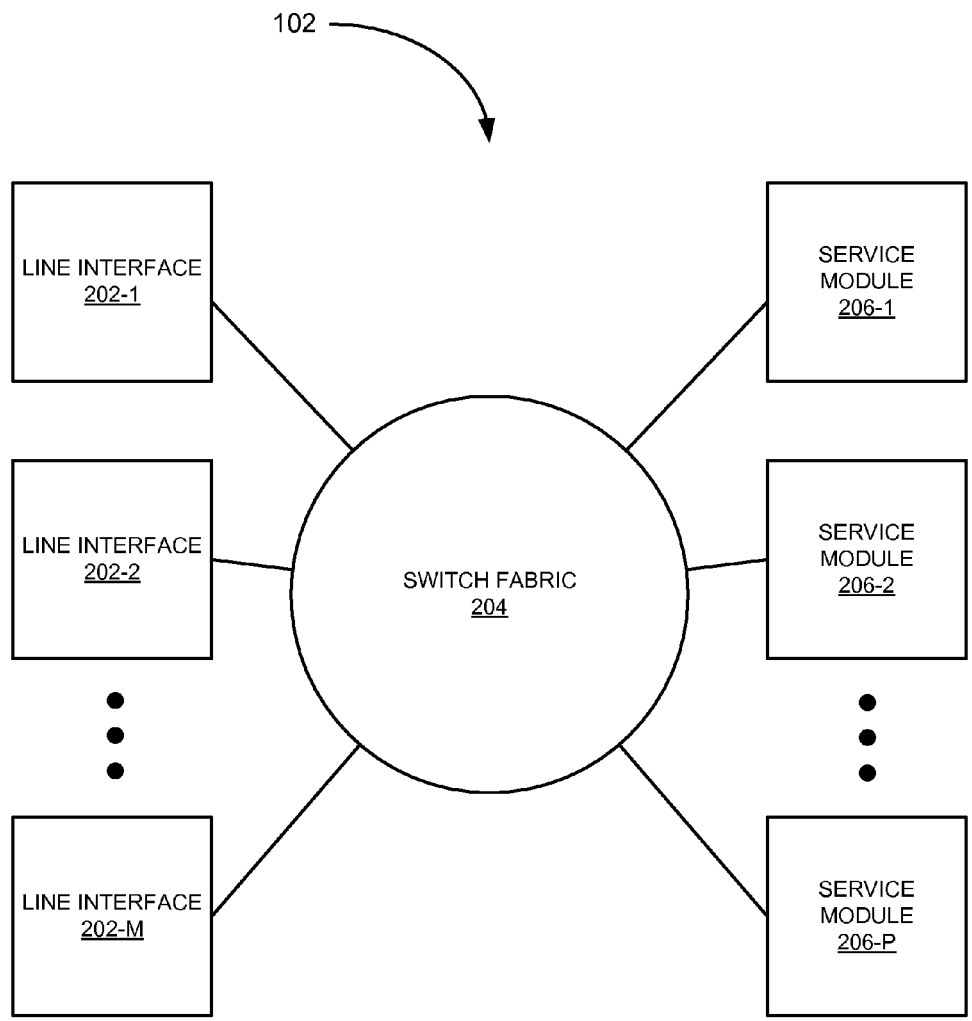
FIG. 2 is a block diagram of an exemplary network element of FIG. 1.

FIG. 2 is a block diagram of an exemplary network element 102. As shown, network element 202 may include line interfaces 202-1 through 202-M, a switch fabric 204, and service modules 206-1 through 206-P. In the following, wherever appropriate, line interfaces 202-1 through 202-M and service modules 206-1 through 206-P may be collectively referred to herein as line interface 202 and service module 206, respectively. While not shown in FIG. 2 for the sake of simplicity, network element 102 may also include a processor, memory, and a bus. Moreover, depending on implementation, network element 102 may include additional, fewer, or different components than those illustrated in FIG. 2. For example, if network element 102 is implemented as a server device, network element 102 may include a large storage for fast data access, and software components, such as a web server, an application server, an email server, etc.

Each of line interfaces 202-1 through 202-M may include devices for receiving incoming data units from devices and/or elements in network 100 and for transmitting data units to other devices/elements in network 100. In addition, line interfaces 202-1 through 202-M may perform data unit forwarding, data unit classification, and/or internal redirection of the data units to service modules 206-1 through 206-P.

Switch fabric 204 may include switches for conveying a data unit from one or more of line interfaces 202-1 through 202-M or service modules 206-1 through 206-P to others of line interfaces 202-1 through 202-M or service modules 206-1 through 206-P.

Each of service modules 206-1 through 206-P may include hardware, software, or a combination of hardware and software for rendering a particular service for a received data unit. After processing the data unit, each of service modules 206-1 through 206-P may drop the data unit or direct the data unit to another of service modules 206-1 through 206-P or line interfaces 202-1 through 202-M.

In directing the data unit, service module 206 may employ a redirection table, which is described in detail below with respect to line interface 202. In one implementation, if service module 206 is implemented on a hardware component separate from other service modules, the service module may include a local copy of the redirection table to increase lookup speed. In another implementation where one or more service modules are implemented in software, the redirection table may be implemented in memory that is shared by the service modules.

Examples of service module 206 may include a firewall service module for permitting or denying data units from part of network 100 (e.g., a subnet) to enter other parts of network 100 (e.g., other subnets in network 100); a load balancing service module for distributing data units to multiple processors, threads, processes, hard disks, computers, and/or any other resources, in order to evenly spread the computational burden associated with handling the data units; an IDS service module for detecting and/or analyzing data units that may pose a threat to the security and/or normal operation of network element 102; an HTTP service module for handling incoming HTTP data units and for sending HTTP responses; etc.

In some implementations, functionalities of some components of network element 102 may be incorporated in other components of network element 102. For example, part of the processor may be included in line interface 202, so that line interface 202 may perform operations that are associated with redirecting and/or forwarding data units.

Figure 3:
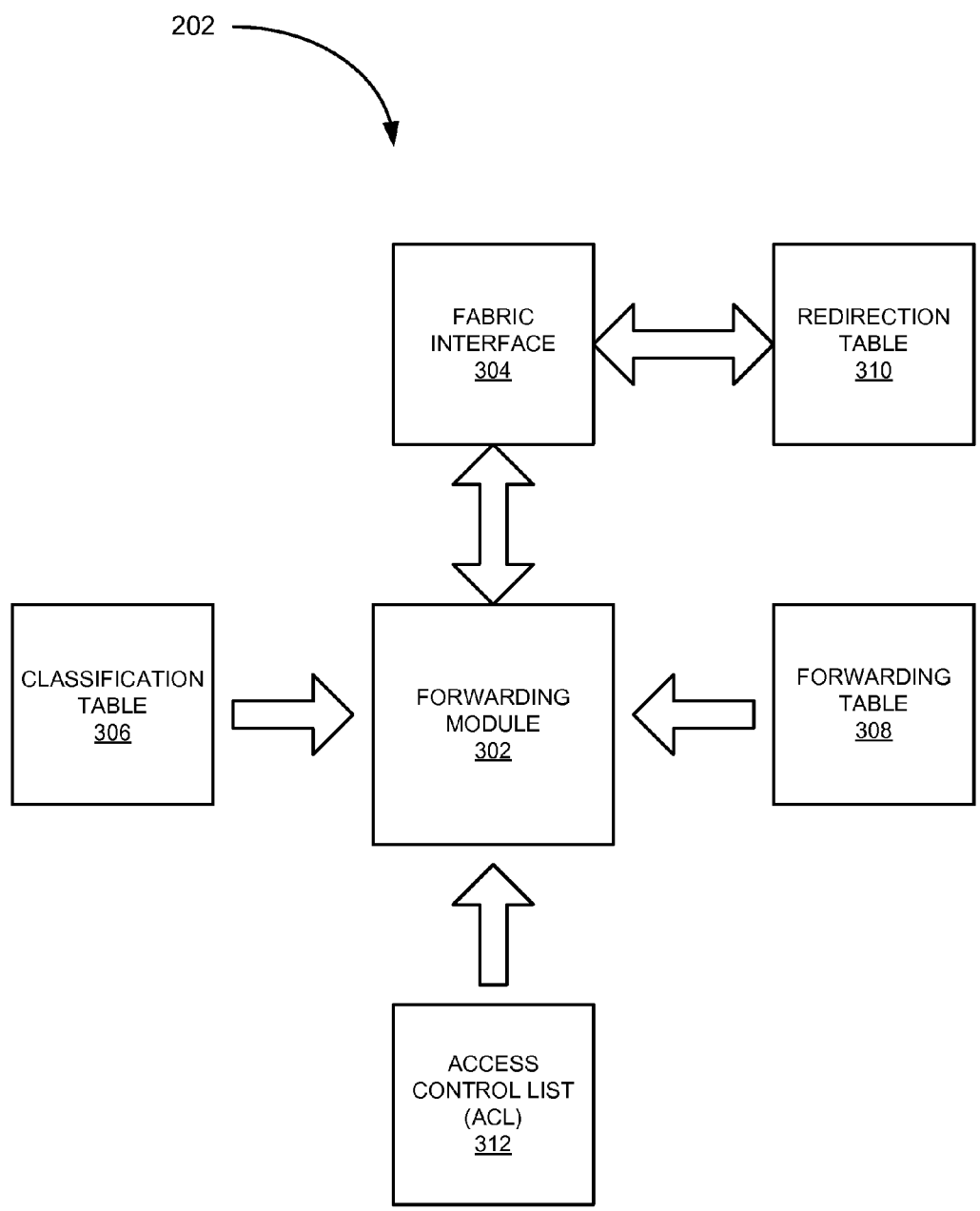
FIG. 3 is a functional block diagram of an exemplary line interface of FIG. 2.

FIG. 3 is a functional block diagram of exemplary line interface 202. As shown, line interface 202 may include a forwarding module 302, a fabric interface 304, a classification table 306, a forwarding table 308, a redirection table 310, and an access control list (ACL) 312. Depending on implementation, line interface 202 may include fewer, additional, or different elements than those illustrated in FIG. 3.

Forwarding module 302 may include hardware and/or software for forwarding and/or classifying a data unit that is received at line interface 202. Forwarding module 302 may perform a lookup into forwarding table 306, classification table 308, and/or ACL 310, and may obtain a data unit descriptor that includes a forwarding address (e.g., a destination switch fabric port, a destination network port, etc.). In addition, forwarding module 302 may obtain a service tag for the data unit based on the classification and/or ACL lookup, augment the data unit by appending the service tag and the data unit descriptor to the data unit, and either direct the augmented data unit to a service module based on the service tag or forward the data unit to an egress line interface.

Fabric interface 304 may include hardware and/or software for providing an interface to switch fabric 204. Fabric interface 304 may include a buffer (not shown) for temporarily storing augmented data units. Without the buffer, the data units may be dropped if too many data units are produced at line interface 202 to be sent immediately to a service module or another line interface.

Classification table 306 may include rules for categorizing data units based on data unit headers. Examples of classification rules may include rules for performing an ACL lookup (e.g., if a field in a data unit header is one of specified values, perform a lookup into ACL 312), for performing a policy based routing (e.g., if a data unit header is a telephony data unit, route the data unit from X to Y via asynchronous transfer mode (ATM)), and for rendering differentiated quality of service (QoS). Forwarding table 308 may include information for identifying the egress line interface to forward an incoming data unit a network destination node based on the data unit's network destination address.

Redirection table 310 may include information for specifying one or more destination service modules. Redirection table 310 may be structured so that it minimizes the number of bits that are used to specify the destination. In one implementation, redirection table 310 may be directly attached to fabric interface and may be used to perform a lookup of the destination service modules. In the same implementation, the lookup may be performed after forwarding/classification/ACL lookups and before the packet is sent through fabric interface.

ACL 312 may include a list of rules that detail services or service ports that are available on network element 102. By performing an ACL lookup based on the data unit's class, a service tag may be obtained.

Figure 4:
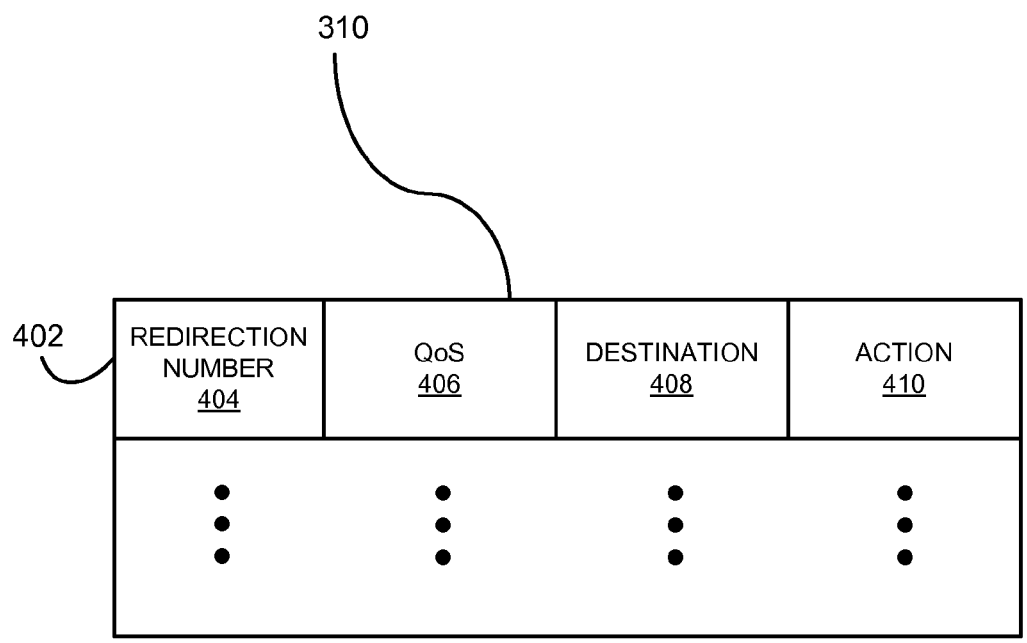
FIG. 4 is a block diagram of an exemplary redirection table of FIG. 3.

FIG. 4 is a block diagram of an exemplary redirection table 310. As shown, each row 402 of redirection table 310 (only one row shown for the sake of simplicity) may include a redirection number field 404, a Quality of Service (QoS) field 406, a destination field 408, and an action field 410. In different implementations, redirection table 310 may be structured differently (e.g., as a linked list) or may include rows with different fields.

Redirection number field 404 may contain a number that specifies a row in redirection table 310. Information that is needed for redirecting a data unit may be obtained by finding the row with a redirection number that matches a redirection index extracted from an augmented data unit. QoS field 406 may include a bit field for specifying a class of service for transporting a data unit across switch fabric 204. Destination field 408 may include a field for specifying one or more service modules as target destinations of the data unit. If the number of service modules in network element 102 is smaller than the largest number that can be expressed by destination field 408, destination field 408 may specify more than one target service module. For example, lower bits of destination field 408 may specify the first target and higher bits may specify the second target. Action field 410 field may specify one of four possible actions that a service module may perform after rendering a service for a data unit: no action; redirect the data unit to the next destination service module or a line interface; send a copy of the data unit to the next destination service module or the line interface; and unspecified.

Figure 5:
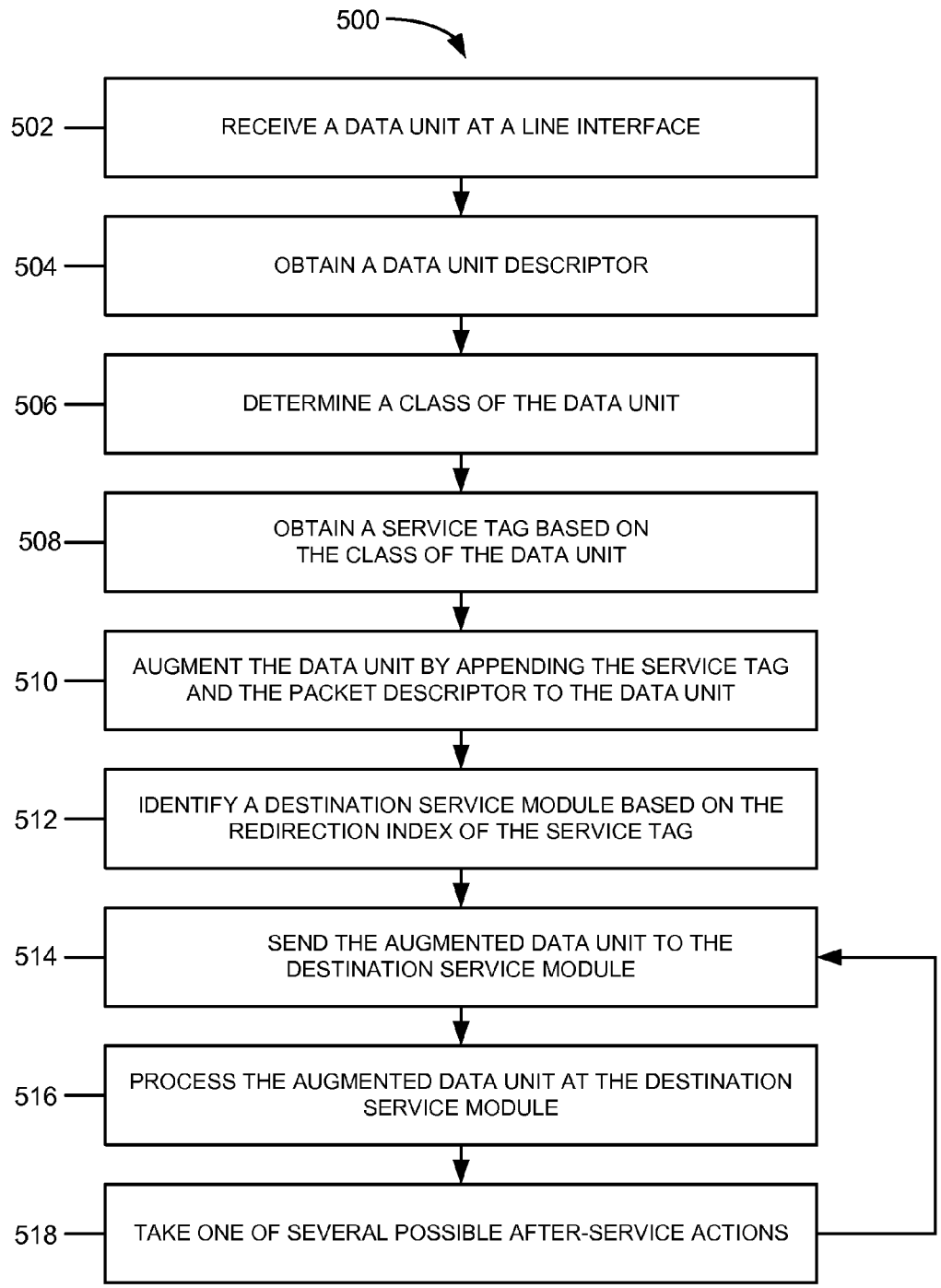
FIG. 5 is a flow diagram of a process for redirecting a data unit to service modules based on the redirection table of FIG. 3.

Exemplary Process for Redirecting Data Units to Service Modules Based on a Service Tag and a Redirection Table The above paragraphs describe system elements that are related to devices and/or components for redirecting data units to service modules based on a service tag and a redirection table. FIG. 5 shows an exemplary process 500 that is capable of being performed by one or more of these devices and/or components.

Figure 6A:
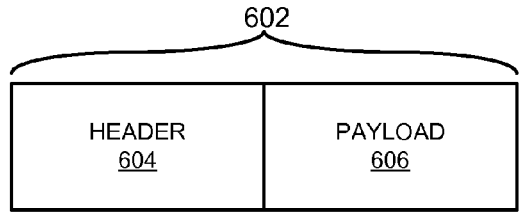
FIG. 6A is a block diagram of an exemplary data unit.

Process 500 may begin at block 502, where a data unit may be received at line interface 202 (block 502). FIG. 6A is a block diagram of an exemplary data unit 602 that may be received at line interface 202. As shown, data unit 602 may include a data unit header 604 and a payload 606. Data unit header 604 may include information about the data unit, such as the version of Internet Protocol (IP) to which the data unit is compliant, the length of the data unit header, a type of transport service the data unit requires, a time to live value, a source IP address, a destination IP address, etc. Payload 606 may include data being transported or carried by data unit 602.

Figure 6B:
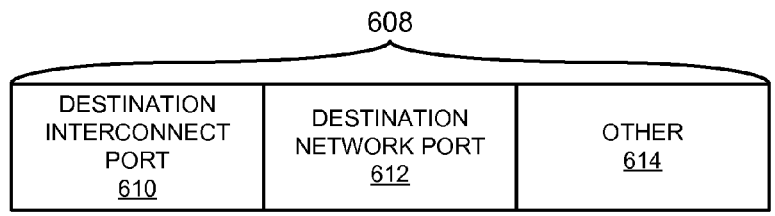
FIG. 6B is a block diagram of a data unit descriptor.

Returning to process 500, a data unit descriptor may be obtained (504). FIG. 6B shows a block diagram of a data unit descriptor 608. As shown, data unit descriptor 608 may include a destination switch fabric port field 610, a destination network port field 612, and another field 614. Depending on implementation, data unit descriptor 608 may include fewer, additional, or other fields than those shown in FIG. 6B.

Destination switch fabric port field 610 and destination network port field 612 may carry identifiers for specific ports on switch fabric 204 and a line interface. Other field 614 may carry other information relevant to the data unit. Information that is necessary to fill destination switch fabric port field 610 and destination network port field 612 may be obtained by performing a lookup in forwarding table 308.

A class of the data unit may be determined (block 506). Classification 306 table may be used to determine the class to which the data unit belongs based on, for example, headers of the data unit and/or destination address, port, etc. Each class may be related on different characteristics that pertain to the data unit, such as its security level that needs to be checked, its destination addresses, etc.

A service tag may be obtained based on the class of the data unit (block 508). In one implementation, the service tag may be obtained by looking up ACL 312 using the class as a key, by retrieving information from the ACL lookup, and by creating the service tag in accordance with the retrieved information.

Figure 6C:
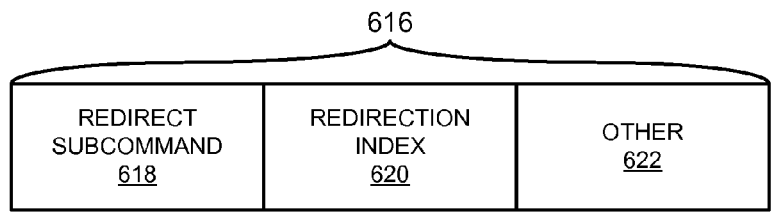
FIG. 6C is a block diagram of a service tag.

FIG. 6C is a block diagram of the service tag 616. As shown, service tag 616 may include a redirect subcommand field 618, a redirection index field 620, and another field 622. In different implementations, service tag 616 may include fewer, additional, or different fields than the ones illustrated in FIG. 6C. Redirect subcommand field 618 may include information that can be used as a command or a hint by a service module. A subcommand in redirect subcommand field 618 may specify further processing that is required for the data unit. For example, a load balancing service module may examine redirect subcommand field 618, and upon detecting a requirement for security-related processing, may send the data unit to a firewall service module.

In addition, a service module may use the subcommand to assign the data unit to a particular hardware component or a service sub-module. For example, assume that redirect subcommand field 618 indicates that the data unit requires a fast response. At the load balancing module, the data unit may be assigned to a high priority process or thread based on the redirect subcommand.

Redirection index field 620 may include a number of the row in redirection table 310 at which information related to the data unit may be found. For example, assume that redirection index field 620 in service tag 616 contains number 12. At the $12^{th}$ row of redirection table 310, destination service modules of the data unit, as well as other relevant information, may be identified. Other field 622 may include other information related to the data unit (e.g., information related to flow of the data unit for fabric interface 304).

Figure 6D:
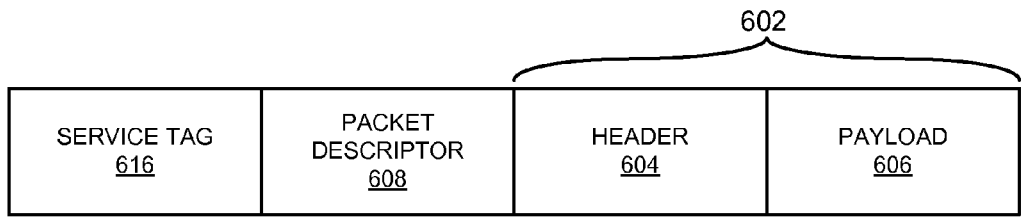
FIG. 6D is a block diagram of a data unit that is appended with the data unit descriptor of FIG. 6B and the service tag of FIG. 6C.

Returning to process 500, at block 510, the data unit may be augmented by appending data unit descriptor 608 and service tag 616 to data unit 602. FIG. 6D shows an augmented data unit that is appended with data unit descriptor 608 and service tag 616. As shown, data unit descriptor 608 may be attached to header 604, and service tag 616 may be attached to data unit descriptor 608.

A destination service module may be identified based on the redirection index of the service tag (block 512). The redirection index of the augmented data unit may be extracted and used to locate information in redirection table 310. Moreover, destination field 408 (FIG. 4) of the row of redirection table 310 whose redirection number matches the redirection index of the augmented data unit may be examined. Consequently, a service module that is designated in destination field 408 may be identified as the destination service module.

The augmented data unit may be sent to the destination service module (block 514). Sending the augmented data unit may entail conveying the augmented data unit to fabric interface 304, which may temporarily buffer the augmented data unit until the augmented data unit is ready to be transported via switch fabric 204.

The data unit may be processed at the destination service module (block 516). When the augmented data unit is received at the destination service module, the service module may render a service that is associated with the service module. For example, an IDS service module may run security tests on the data unit.

At block 518, the service module may take one of several possible after-service actions. In one case, if there is no further processing that is required for the augmented data unit, service tag 616 may be cleared (e.g., fill the fields of service tag 616 with "0's") and the data unit may be sent to the original destination that is specified in data unit descriptor 608. For example, if an IDS service module determines that the augmented data unit does not pose a threat to the security of network element 102, the IDS service module may clear service tag 616 and send the data unit to an egress port in a line interface of network element 102.

In another case, when there is no further processing that is required, data unit descriptor 608 and contents of the data unit may be modified (e.g., network address). Depending on the modification, the data unit may be sent to a line interface that is different from one that has been originally specified. Examples of service modules that can change data unit descriptor 608 and/or the data unit contents may include a firewall service module and a load balancing service module.

In yet another case, if further processing is required, the service tag of the augmented data unit may be replaced with a new service tag, and the augmented data unit may be sent to another service module. For example, if the IDS service module determines that the data unit poses a potential threat, the IDS service module may rewrite the service tag and send the data unit to a service module that can examine the data unit in-depth. In another situation, the service tag may not be replaced, and the data unit may be sent to another service module that is specified in redirection table 310. In either of the above situations, process 500 may return to block 514 to repeat blocks 514-518.

In some cases, the augmented data unit may have been duplicated during services performed at a service module. In such instances, while the augmented data unit may be dropped or sent to another service module for further processing, the augmented data unit may not be sent to its network destination. A copy of the augmented data unit may already have been sent to the destination by the line interface that received the data unit.

In process 500, at each service module, the data unit may be directed to a next service module or a line interface without an ACL lookup. Because the ACL lookup requires additional processing, the data unit may be processed faster without the ACL lookup. In addition, using the service tag and the redirection table may spare a user or an administrator from having to treat each service module as a network destination node of the data unit and reconfiguring network parameters. Treating a service module as a network node may require an administrator or a user to perform burdensome and mistake-prone tasks that are associated with reconfiguring network parameters when a service module is added to and/or removed from network element 102.

Example

Figure 7:
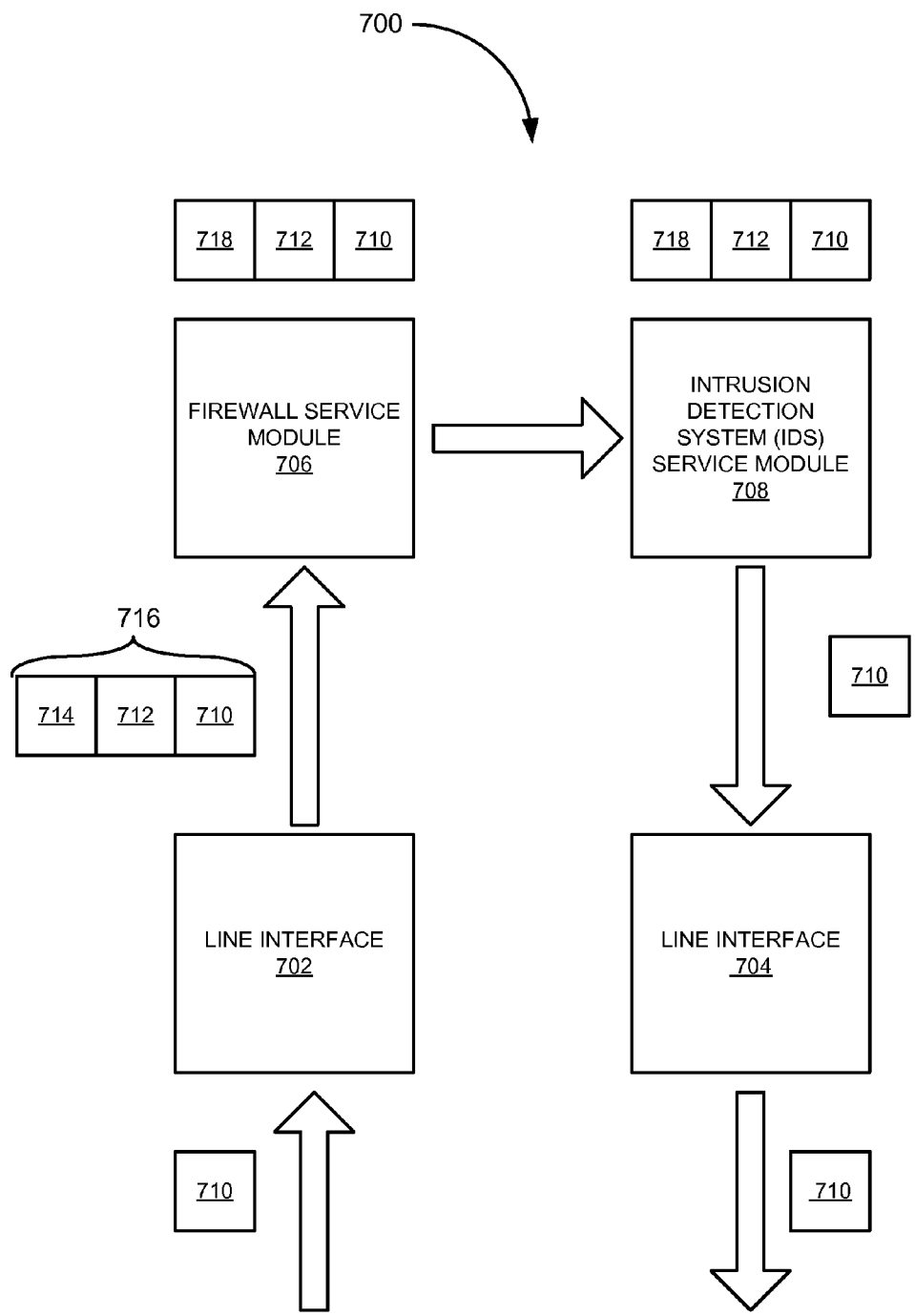
FIG. 7 illustrates a flow of a data unit through two service modules.

The following example, with reference to FIG. 7, illustrates a process for redirecting data units to service modules based on a service tag and a redirection table. The example is consistent with the exemplary process described above with reference to FIG. 5.

In the example, as illustrated in FIG. 7, assume network element 700 includes line interfaces 702 and 704, a firewall service module 706, an IDS service module 708, and a switch fabric (not shown). In addition, assume that a data unit 710 arrives at line interface 702.

At line interface 702, service tag 712 and data unit descriptor 714 are obtained. Values for some of the fields in service tag 712 and data unit descriptor 714 are determined by performing lookups in forwarding table 308 and redirection table 310 (as described above with respect to FIG. 5). As the result of the lookups, destination switch fabric port field 610 in data unit descriptor 714 may designate a port on the switch fabric; destination network port field 612 may designate a port on egress line interface 704; and service tag 712 may designate firewall module 706 as its destination, indirectly via redirection table 310.

Once service tag 714, data unit descriptor 712, and data unit 710 are obtained, they are assembled to form an augmented data unit 716. Augmented data unit 716 is sent to firewall service module 706, as indicated by the arrow between firewall service module 706 and line interface 702 via a fabric interface (not shown) and the switch fabric.

When augmented data unit 716 arrives at firewall service module 706, firewall service module 706 determines that data unit 710 may be permitted to enter the network that is connected to network element 700. In addition, based on contents of redirect subcommand field 618 in service tag 712, firewall service module 706 determines that further processing is required at IDS service module 708. Firewall service module 706 replaces service tag 714 of augmented data unit 716 with service tag 718, which indirectly assigns IDS service module 708 as its next destination service module via redirection table 310. Augmented data unit 716 is sent to IDS service module 708.

When augmented data unit 716 enters IDS service module 708, IDS service module analyzes data unit 710 and determines data unit 710 has a valid authorization to enter network element 700. In addition, based on contents of redirect subcommand field 618, service tag 718 is cleared, and data unit 710 is sent to line interface 704, the original destination that is specified in data unit descriptor 608. At line interface 704, data unit 710 is sent to the network that is connected to network element 700.

Conclusion

The foregoing description of implementations provides illustration, but is not intended to be exhaustive or to limit the implementations to the precise form disclosed. Modifications and variations are possible in light of the above teachings or may be acquired from practice of the teachings.

For example, while series of blocks have been described with regard to an exemplary process illustrated in FIG. 5, the order of the blocks may be modified in other implementations. In addition, non-dependent blocks may represent acts that can be performed in parallel to other blocks.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, an application specific integrated circuit, or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such. Also, as used herein, the article "a" is intended to include one or more items. Where one item is intended, the term "one" or similar language is used. Further, the phrase "based on" is intended to mean "based, at least in part, on" unless explicitly stated otherwise.

What is claimed is:

1. A method comprising:
    receiving a data unit at an ingress line interface of a network device;
    at the ingress line interface, performing a lookup into a classification table, associated with the ingress line interface, based on header information of the data unit;
    identifying a class of the received data unit based on the performed lookup;
    at the ingress line interface, obtaining a service tag based on the class of the data unit, where the service tag includes a redirect subcommand field, the redirect subcommand field including a subcommand, used by a service module of the network device, to specify further processing required by the data unit, or provide an indication for assigning the data unit to at least one of a component or a service sub-module of the network device;
    identifying at the ingress line interface, based on information included in the obtained service tag, the service module of the network device;
    sending, based on identifying the service module, the service tag and the data unit, across a switch fabric of the network device from the ingress line interface to the service module in the network device;
    performing a service for the data unit at the service module of the network device based on the subcommand;
    determining whether the data unit requires further processing; and
    upon determining the data unit requires no further processing, clearing fields of the service tag, and sending the data unit to a network address originally included in a data unit descriptor.

2. The method of claim 1, further comprising:
    sending the data unit from the service module to an egress line interface.

3. The method of claim 1, further comprising:
    upon determining the data unit requires further processing, sending the data unit from the service module to another service module based on a value of a destination field, corresponding to the other service module, that is indicated in a redirection table.

4. The method of claim 1, further comprising:
    upon determining the data unit requires further processing, sending the data unit from the service module to another service module by rewriting the service tag and by following a new value of a destination field that is indicated in a redirection table.

5. The method of claim 1, where sending the service tag and the data unit includes:
    sending the service tag and the data unit to a fabric interface; and
    providing the fabric interface with a fabric port number.

6. The method of claim 1, where obtaining a service tag includes:
    performing an access control list (ACL) lookup based on the class to find information that is needed to create the service tag.

7. The method of claim 1, further comprising:
    obtaining a data unit descriptor that includes a destination network port number and a destination switch fabric port number.

8. The method of claim 1, where obtaining a service tag further includes:
    creating the service tag with a redirection index that references a row in a redirection table, the row including information in a destination field indicative of the service module.

9. The method of claim 8, where sending the service tag and the data unit to the service module includes:
    looking up the row using the redirection index in the service tag and the redirection table;
    obtaining a target destination within the row; and
    sending the service tag and the received data unit to the target destination.

10. The method of claim 1, where sending the service tag and the data unit to the service module includes:
    copying the data unit and sending the copy of the data unit to a target destination of the data unit.

11. A device comprising:
    a first line interface to:
        receive a data unit,
        identify a class of the received data unit,
        obtain a data unit descriptor and a service tag using the data unit,
            where the service tag is obtained by an access control list (ACL) lookup, the ACL including a plurality of rules that detail one or more services that are available on the device,
            where the service tag includes a redirect subcommand field, the redirect subcommand field including:
                a subcommand, used by a service module of the network device, to:
                    specify further processing required by the data unit, or
                    provide an indication for assigning the data unit to at least one of a component or a service sub-module of the network device,
        augment the data unit by appending the data unit descriptor and the service tag to the data unit, and
        send the augmented data unit from the first line interface to the service module; and
    the service module to:
        receive the augmented data unit from the first line interface,
        render a service for the augmented data unit, and
        perform, based on the subcommand, one of:
            sending the augmented data unit to another service module,
            sending the augmented data unit to a second line interface,
            dropping the augmented data unit, or
            clearing fields of the service tag and sending the augmented data unit to a network address originally included in the data unit descriptor, if the subcommand does not specify further processing is required.

12. The device of claim 11, where the first line interface includes:

a redirection table that includes information about the service module and that may be searched based on a redirection index in the service tag.

13. The device of claim 11, where the first line interface includes:
a forwarding table that provides information needed to create the data unit descriptor.

14. The device of claim 11, further comprising:
a switch fabric that can convey the data unit from the first line interface to the service module, from the first line interface to a second line interface, or from the service module to another service module.

15. The device of claim 11, where the service tag includes:
a redirect subcommand and a redirection index that references service module target destination information in a redirection table.

16. A device comprising:
means for receiving a data unit at an ingress line interface of a network device;
means for obtaining a data unit descriptor based on a forwarding table and the received data unit;
means for identifying a class of the received data unit at the ingress line interface based on a classification table lookup using header information of the data unit, where the classification table includes one or more rules for performing an access control list (ACL) lookup or rendering differentiated quality of service;
means for obtaining a service tag at an ingress line interface based on the class of the received data unit, where the service tag includes a redirect subcommand field, the redirect subcommand field including a subcommand, used by a service module of the network device, to specify further processing required by the data unit, or provide an indication for assigning the data unit to at least one of a component or a service sub-module of the network device;
means for augmenting the data unit by attaching the service tag and the data unit descriptor to the data unit;
means for retrieving a target destination of the data unit from a redirection table by using a redirection index in the service tag;
means for sending the data unit from the ingress line interface to the service module of the network device based on the retrieved target destination;
means for determining whether the augmented data unit requires further processing; and
means for clearing fields of the service tag and means for sending the augmented data unit to a network address originally included in the data unit descriptor, upon determining the data unit requires no further processing.

17. The device of 11, where the redirection table includes at least one row, the row including a destination field specifying two or more service modules.

18. The device of claim 16, further comprising:
means for sending the data unit from the service module to another service module by rewriting the service tag and by following a new value of a destination field that is indicated in the redirection table, upon determining the data unit requires further processing.

* * * * *